United States Patent
Meis et al.

(10) Patent No.: US 6,199,009 B1
(45) Date of Patent: Mar. 6, 2001

(54) COMPUTER-CONTROLLED NAVIGATION PROCESS FOR A VEHICLE EQUIPPED WITH A TERMINAL, TERMINAL AND TRAFFIC INFORMATION CENTER

(75) Inventors: Josef Meis, Münster; Jens Oppler, Düsseldorf; Peter Stangier, Wesseling, all of (DE)

(73) Assignee: Mannesmann Sachs AG, Düsseldorf (DE)

( * ) Notice: Subject to any disclaimer, the term of this patent is extended or adjusted under 35 U.S.C. 154(b) by 0 days.

(21) Appl. No.: 09/331,106
(22) PCT Filed: Nov. 26, 1997
(86) PCT No.: PCT/DE97/02816
§ 371 Date: Jun. 16, 1999
§ 102(e) Date: Jun. 16, 1999
(87) PCT Pub. No.: WO98/27528
PCT Pub. Date: Jun. 25, 1998

(30) Foreign Application Priority Data

Dec. 16, 1996 (DE) ............................................. 196 53 690
Nov. 20, 1997 (DE) ............................................. 197 53 172

(51) Int. Cl.[7] .............................. G01G 21/00; G06G 7/78
(52) U.S. Cl. ........................ 701/202; 701/210; 701/205; 340/991; 340/992
(58) Field of Search .................................... 701/202, 205, 701/210, 117; 340/991, 992, 993, 994

(56) References Cited

U.S. PATENT DOCUMENTS

| 5,652,706 | * | 7/1997 | Morimoto et al. ................... 701/210 |
| 5,742,240 | * | 4/1998 | Asanuma et al. ..................... 340/995 |
| 5,841,366 | * | 11/1998 | Yamamoto et al. .................. 340/901 |
| 6,026,346 | * | 2/2000 | Ohashi et al. ........................ 701/210 |
| 6,032,121 | * | 2/2000 | Dietrich et al. ........................... 705/8 |
| 6,052,645 | * | 4/2000 | Harada .................................. 701/212 |

* cited by examiner

Primary Examiner—William A. Cuchlinski, Jr.
Assistant Examiner—Olga Hernandez
(74) Attorney, Agent, or Firm—Cohen, Pontani, Lieberman & Pavane

(57) ABSTRACT

Navigation of a vehicle in a traffic network is optimized by a terminal, a traffic information center and a computer-assisted navigation method for a vehicle equipped with a terminal in a traffic network, using a digital map of the traffic network, in which a user requests a desired destination from the terminal and in which a route to the destination is determined, taking into account previous driving habits.

22 Claims, 4 Drawing Sheets

COMPUTER-CONTROLLED NAVIGATION PROCESS FOR A VEHICLE EQUIPPED WITH A TERMINAL, TERMINAL AND TRAFFIC INFORMATION CENTER

BACKGROUND OF THE INVENTION

1. Field of the Invention

The invention relates to a computer-assisted navigation method for a vehicle equipped with a terminal. The invention also relates, to the terminal in the vehicle and to a traffic information center.

2. Description of the Prior Art

Navigation systems for computer-assisted navigation of a vehicle equipped with a terminal in a traffic network, which use a digital map of the traffic network, are known. A route to be recommended to the driver of the vehicle equipped with the terminal can either be determined in the terminal or determined in a traffic information center and transmitted to the terminal. However, a traffic jam, an accident, a recently closed road, a driver error, or other types of anomalies may mean that the route actually taken by the vehicle differs from the recommended route. Systems which use a digital map to lead the driver back onto the recommended route which he/she has left are known.

SUMMARY OF THE INVENTION

The object of the present invention is to achieve optimum navigation for a vehicle even if the vehicle leaves a recommended route. The object is achieved by a method for computer-assisted navigation of a vehicle having a terminal in a traffic network, comprising the steps of receiving a desired destination at the terminal in the vehicle as a user input, determining the first recommended route to the desired destination, monitoring a current position of the vehicle as the vehicle travels toward the desired destination, determining whether the vehicle turns off of the first recommended route, performing a plausibility check when it is determined that the vehicle has turned off of the recommended route to determine whether the turn off of the recommended route was inadvertent, and determining a second recommended route in response to the step of performing the plausibility check.

Whereas known systems attempt in all cases to lead a driver leaving a recommended route back to the recommended route as soon as possible, the invention is based on the assumption that the driver has not always left a recommended route inadvertently each time, but that the driver has reasons for a preference which is different than the first recommended route. If a discrepancy is detected between the current position and/or direction of travel and the recommended first route, a route or route section which is preferred by the driver of the vehicle and is assumed to exist, at least up until a plausibility check is performed, is determined and is taken into account. A second recommended route to the destination position is determined, at least to the extent that a plausibility check is carried out and that, provided that the plausibility check is positive, it is used in the second route. The method is in this case independent of the way in which data about a route is transmitted. A vehicle may leave a route on the basis of the current vehicle position and/or on the basis of the current direction of travel of the vehicle; the way in which the departure is associated with the recommended route depends on how the recommended route is shown. A preferred route section is a route which differs from the first recommended route only in part, e.g. in a section in the direction of travel.

Previous driving habits can be taken into account not only when a vehicle leaves a recommended route but also when a route is first calculated.

On the basis of the recommended route, the terminal in the vehicle provides the user of the terminal, i.e. the driver of the vehicle, with navigation advice. For example, the terminal provides information about opportunities for turning off which the driver is to take and/or a graphical representation of the route or a section of the route.

The route can be calculated in the terminal. This can also be done in a traffic information center, in which case data about the recommended route are transmitted to the terminal by radio, particularly mobile radio. Determining the route in the terminal has the advantage of autonomous navigation, whereas determining the route in a traffic information center has the advantage that a terminal is inexpensive and that traffic data in a traffic information center can be used directly.

The principle of assuming that, at least in some cases, the driver leaves the recommended first route because of a preferred route or route section which differs from the first recommended route can be implemented in different ways. Thus, for example, when a vehicle leaves a route, a plausibility check can first be carried out to determine whether it is plausible that the driver has left the recommended route on account of a preferred route or route section (for example on account of traffic jams known to the driver or which the driver can see, traffic obstacles, etc.), that is to say that the driver has not left the route inadvertently. The parameters for the plausibility check in the terminal can be modified by radio via a traffic information center.

It is also possible for a vehicle's departure from a route to be taken into account in a traffic information center in that, particularly when a number of vehicles are leaving a route in the same area, there can be assumed to be an obstacle, such as a traffic jam, or an accident on the first route, so that, for recommending routes for other vehicles, at least one section of the first route after the point of departure is avoided.

If a plausibility check determines a known point of departure, i.e. a preferred route differing from the recommended route, the preferred route or route section can be determined in different ways and used to determine a second recommended route, which includes the known point of departure, to the destination position.

For example, it is possible to prevent a road from being rejoined, that is to say the first recommended route from being overlapped by the second recommended route on a section of road extending up to a minimum distance behind the point of departure on the first recommended route—if this is possible and helpful in the traffic network; this means that, in particular, an assumed traffic jam, or accident can be bypassed after the point of departure.

The current position and direction of travel of the vehicle can be recorded in different ways. The position can be recorded by a GPS. The direction of travel can be recorded by repeated GPS recording and difference formation and/or by taking into account turns of the steering wheel of a vehicle and/or by a compass and/or by a system which records changes in direction. Furthermore, a position for determining the direction of travel is alternatively or additionally possible on the basis of the journey of a vehicle being followed on a digital map, in particular taking into account turns of the steering wheel or changes in direction and/or a distance meter (odometer).

Data is expediently transmitted from the terminal to a traffic control center by radio, in particular by mobile radio.

DESCRIPTION OF THE DRAWINGS

Other features and advantages of the invention can be found in the other subclaims and in the description below of an exemplary embodiment with reference to the drawing, in which:

DETAILED DESCRIPTION OF THE PREFERRED EMBODIMENTS

Figure 1:
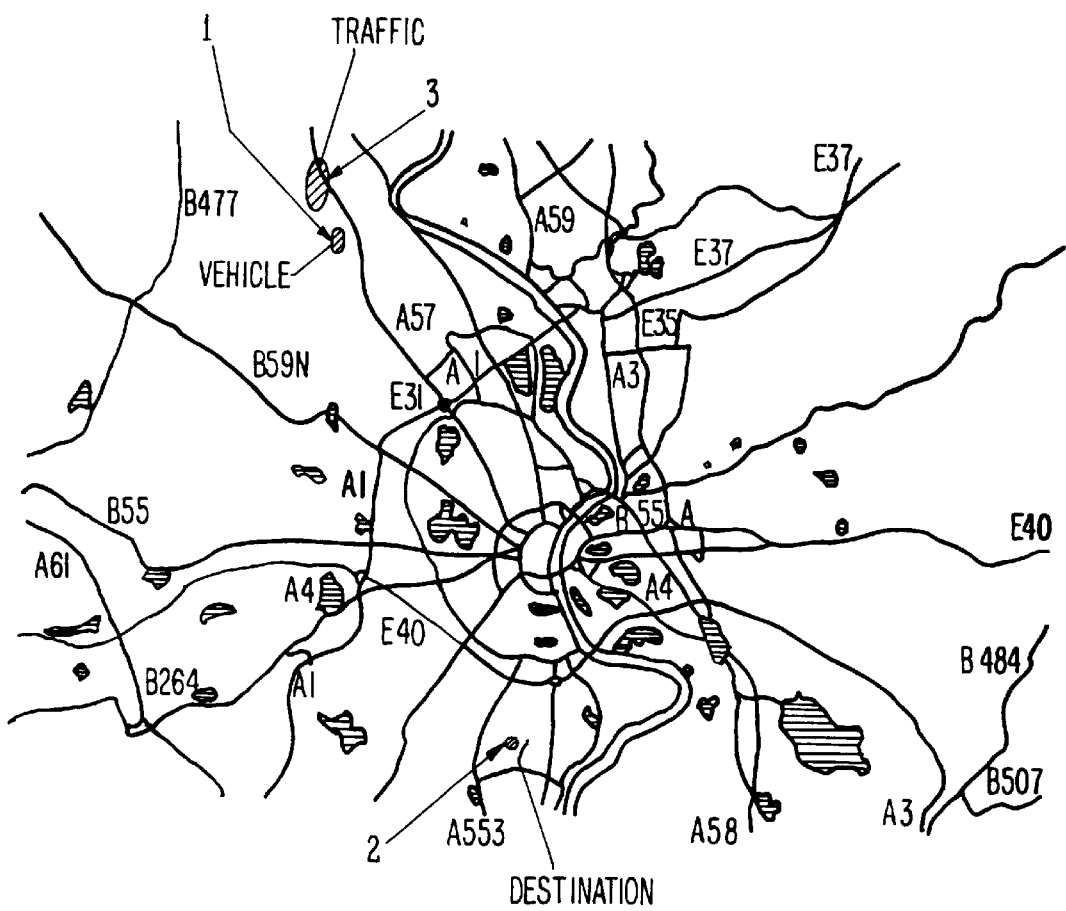
FIG. 1 shows a first example of a vehicle departing from a first recommended journey route through a traffic network, necessitating recalculation of the route.
Figure 4:
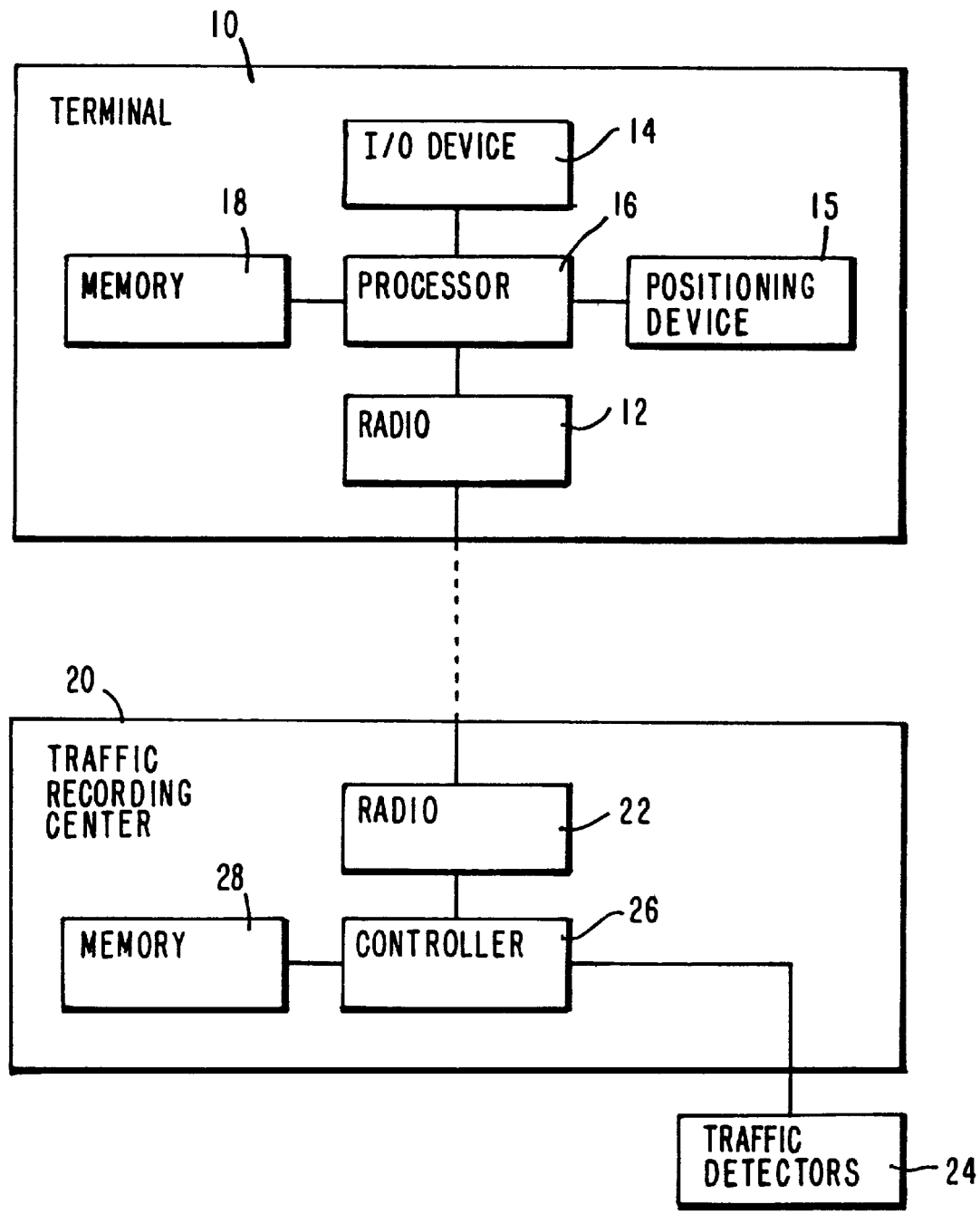
FIG. 4 shows a terminal and a traffic information center of the invention.

FIG. 1 shows part of a detail of a traffic network, namely the freeway and federal road network around Cologne. On the basis of its starting position (for example Düsseldorf) and its desired destination position 2 (situated in the south of Cologne, for example), a vehicle 1 is recommended a first route along which the vehicle 1 is initially moving, in the example shown, on the A57 from north to south, i.e. from top to bottom in FIG. 1. For this, the vehicle receives navigation advice regarding the first recommended route, that is, for example, advice about necessary turns to be made etc. Refering also to FIG. 4, the position of the vehicle 1 is recorded continuously in the vehicle 1 via a positioning device 15 such as a GPS (Global Positioning System) connected to a terminal 10 in the vehicle 1. In addition, the direction of travel is recorded continuously, for which purpose a number of subsequent GPS positions with difference formation were used in each case. The direction of travel and the position of the vehicle are continuously compared with the recommended route in memory 18 of the terminal 10. To this end, a controller 16 or 26 uses a suitable method was used to associate the position, in particular, with a stretch of road on a digital map of the traffic network. The digital map may be in the memory 18 of the terminal 10 and/or in a memory 28 of a traffic information center 20. If navigation takes place autonomously in the vehicle alone, then there is a digital map and a route calculation program in the terminal 10 in the vehicle; if the vehicle is navigated by the traffic recording center 20 then position and/or direction data is repeatedly transmitted from the vehicle to a traffic information center by radio 12, 22, in this case mobile radio, and compared in the controller 26 of the traffic information center 20 with the recommended route that has been calculated there. Data regarding the recommended route is transmitted by radio 12, 22 from the traffic information center 20 to a terminal 10 of vehicle 1 for display there or for providing navigation advice there for a terminal user.

In the present case, the terminal 10 (or alternatively or additionally the traffic information center 20) establishes that the vehicle is not on a section of road belonging to the recommended route on a digital map of the traffic network (in the memory 18 of terminal 10 and/or in the memory 28 of traffic information center 20). In the present example, the vehicle 1 is to the west, i.e. to the left in FIG. 1, of the A57 freeway which the recommended route uses. This means that, firstly, a plausibility check is carried out to ascertain whether the driver had cause to leave the recommended route. In the present case, there are no freeways, federal roads etc. leading to the destination 2 in the vicinity of the current position or in the direction of travel of the vehicle 1, so that the assumption can be made that there is a local reason for the vehicle 1 to have turned off such as a traffic jam, or accident on the A57 in the area where the vehicle 1 departed from the stretch of road. The assumption is therefore that the driver turned off because of a preferred route, and this information is included in the calculation of a second recommended route. The calculator of the second recommended route can be done, for example, such that the driver is not directed back to the A57 or such that the A57 is not rejoined until after a certain distance. In the former case, the vehicle 1 is directed via village roads (not shown here) to the route B59N and on to the destination 2.

Figure 2:
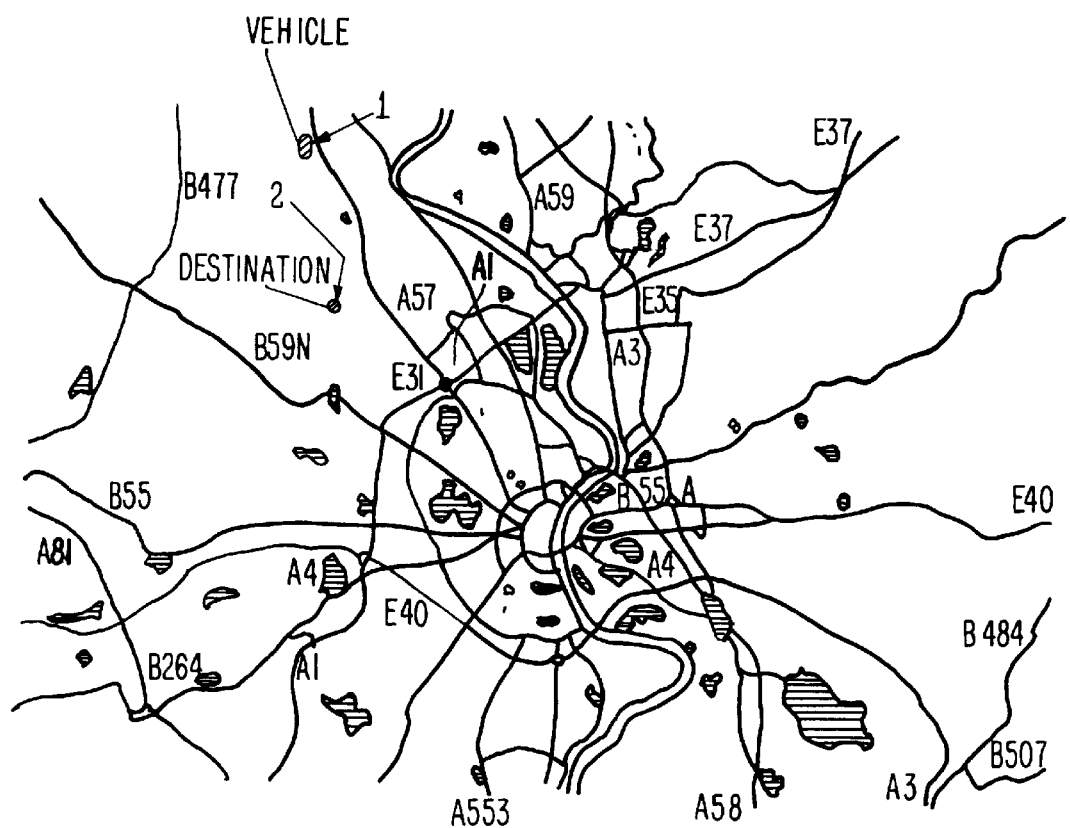
FIG. 2 shows a second example of a vehicle departing from a recommended journey route.

In the example shown in FIG. 2, the position of the vehicle 1 to the side of the route A57 indicates that it has left the route A57. However, in this case the destination 2 is close by, so that it is possible that the vehicle has inadvertently turned off from the A57 freeway at an exit which is too early. Therefore the plausibility check shows that this is not definitely a preferred route different than the recommended first route. Hence, it is recommended that the vehicle 1 rejoin the route A57 in this example.

Figure 3:
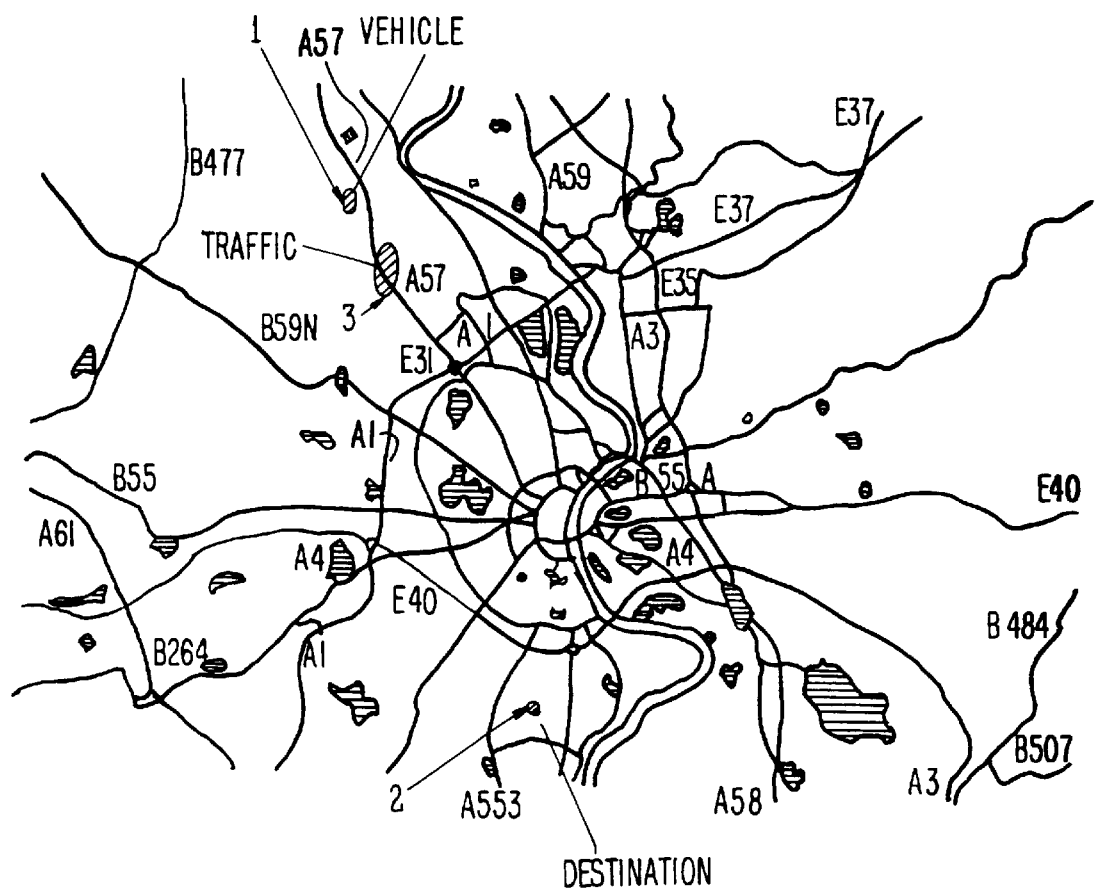
FIG. 3 shows a third example of a vehicle departing from a journey route.

In the example shown in FIG. 3, the traffic information center 20 detects an area 3 of slow-moving traffic in the direction of travel of the vehicle 1 on the recommended first route, using stationary and/or mobile traffic detectors 24, for example, so that the plausibility check shows that the vehicle has departed from the first recommended route on account of a route preferred by the driver of the vehicle because of the traffic jam 3. A second recommended route is therefore determined here such that the vehicle 1 is not directed back to the A57 and hence into the traffic jam 3, but rather the traffic jam 3 is bypassed using minor roads, and the A57 is rejoined only after this. Alternatively a completely new route to the destination 2, bypassing the A57, is planned via route B59N, route A1, route E40 or route A53.

In addition to recalculating the route when a vehicle leaves a route, the method according to the invention also optimizes the first calculation of a route.

The method can be implemented as a program in the terminal 10 in the vehicle 1 and/or the traffic information center 20. The program comprises, particularly in the terminal and/or in the information center, a route calculation subroutine, a subroutine for requesting the starting position and the desired destination position, a subroutine for recording the vehicle position and/or the direction of travel and a program for associating the journey position and/or direction of travel with a digital map in the terminal or in the traffic information center.

What is claimed is:

1. A traffic information center for a computer assisted navigation system for a vehicle, comprising:

a processor connected to a memory, a user interface and an input device, configured for determining a first recommended route to a desired destination, monitoring a current position of the vehicle as the vehicle travels toward the desired destination, determining whether the vehicle turns off of the first recommended route, performing a plausibility check when it is determined that the vehicle has turned off of the first recommended route to determine whether the turn off of the first recommended route was inadvertent and determining a second recommended route in response to the result of the plausibility check; and a communications device connected to said processor for transmitting and receiving data from a terminal in the vehicle, said data comprising a desired destination, current location of the vehicle, and data relating to said first and second preferred routes produced in said traffic information center.

2. The traffic information center of claim 1, wherein said communications device comprises a mobile radio device.

3. A terminal for a computer assisted navigation system of a vehicle, comprising:

a processor connected to a memory, a user interface and an input device, said processor configured for determining a first recommended route to a desired destination, monitoring a current position of the vehicle as the vehicle travels toward said desired destination, determining whether the vehicle turns off of the first recommended route, performing a plausibility check when it is determined that the vehicle has turned off of the first recommended route to determine whether the turn off of the first recommended route was inadvertent, and determining a second recommended route as a result of the output of the plausibility check.

4. The terminal of claim 3, further comprising a Global Positioning System (GPS).

5. The terminal of claim 3, wherein said memory comprises a digital map of a traffic network.

6. The terminal of claim 3, further comprising a communications device for receiving data regarding said first and second recommended routes from a traffic information center.

7. The terminal of claim 6, wherein said communications device comprises a radio.

8. A method for computer assisted navigation of a vehicle having a terminal in a traffic network, comprising the steps of:

receiving a desired destination at the terminal in the vehicle as a user input;

determining a first recommended route to the desired destination taking into account previous driving habits;

monitoring a current position of the vehicle as the vehicle travels towards the desired destination;

determining whether the vehicle turns off of the first recommended route;

performing a plausibility check when it is determined that the vehicle has turned off of the recommended route to determine whether the turn off of the recommended route was inadvertent; and determining a second recommended route in response to the step of performing a plausibility check.

9. The method of claim 8, wherein, if the vehicle turns off of the first recommended route onto a relatively low category road, said step of determining a second recommended route takes into account the relatively low category road.

10. The method of claim 8, wherein said step of performing a plausibility check takes into account an actual rate of travel of the vehicle on said first recommended route before the turn off; and said step of determining a second recommended route excludes using said first recommended route at least over a defined distance from the current vehicle position if the actual rate of travel is determined to be slower than an expected rate of travel.

11. The method of claim 8, wherein said step of performing a plausibility check comprises determining whether a traffic jam is reported on the first recommended route; and said step of determining a second recommended route excludes using said first recommended route at least over a defined distance from the current vehicle position where it is determined that a traffic jam is reported on the first recommended route.

12. The method of claim 8, wherein said steps of determining a first recommended route and determining a second recommended route are performed at the terminal of the vehicle.

13. The method of claim 8, wherein said step of determining whether the vehicle turns off of the recommended route comprises comparing the current position of the vehicle to the recommended route on a digital map.

14. The method of claim 8, further comprising a step of modifying parameters for said step of performing said plausibility check by transmitting commands from a traffic control center remote from the vehicle to the terminal in the vehicle.

15. The method of claim 8, wherein said step of determining a first recommended route and said step of determining a second recommended route comprise using traffic information for determining the first and second recommended routes.

16. The method of claim 8, wherein said steps of determining the first recommended route and the second recommended route comprise using distances on a digital map and journey times.

17. The method of claim 8, wherein said step of monitoring a current position of the vehicle comprises using a Global Positioning System (GPS).

18. The method of claim 8, wherein said step of monitoring a current position of the vehicle further comprises recording a current direction of travel using a compass.

19. The method of claim 8, wherein said step of monitoring a current position of the vehicle further comprises recording a current direction of travel by monitoring turns of a steering wheel of the vehicle.

20. The method of claim 8, wherein said step of monitoring a current position of the vehicle comprises monitoring the turns of a steering wheel of the vehicle and a distance meter.

21. The method of claim 8, wherein said steps of determining a first recommended route and determining a second recommended route are performed at a traffic information center remote from the vehicle.

22. The method of claim 21, further comprising the steps of transmitting the first recommended route and the second recommended route to the terminal via radio.

* * * * *

UNITED STATES PATENT AND TRADEMARK OFFICE
CERTIFICATE OF CORRECTION

PATENT NO.   : 6,199,009 B1　　　　　　　　　　　　　　　　　　　　　　　Page 1 of 1
DATED        : March 6, 2001
INVENTOR(S)  : Josef Meis, Jens Oppler and Peter Stangier It is certified that error appears in the above-identified patent and that said Letters Patent is hereby corrected as shown below:

<u>Title page,</u>
Item [73], change the Assignee information from "[73] Assignee: Mannesmann Sachs AG, Düsseldorf (DE)" to -- [73] Assignee: Mannesmann AG, Düsseldorf (DE) --

Signed and Sealed this

Seventeenth Day of December, 2002

*JAMES E. ROGAN*
*Director of the United States Patent and Trademark Office*